United States Patent

Sasaki et al.

[11] Patent Number: 5,940,245
[45] Date of Patent: Aug. 17, 1999

[54] DOOR OPENING-AND-CLOSING MECHANISM OF RECORDING/REPRODUCING APPARATUS

[75] Inventors: Shinkichi Sasaki; Harutaka Sekiya, both of Fukushima-ken; Jun Chiba, Miyagi-ken, all of Japan

[73] Assignee: Alps Electric Co., Ltd., Tokyo, Japan

[21] Appl. No.: 08/843,077

[22] Filed: Apr. 24, 1997

[30] Foreign Application Priority Data

May 2, 1996 [JP] Japan ................................ 8-111421

[51] Int. Cl.6 ............................ G11B 33/02; G11B 17/04
[52] U.S. Cl. ...................................... 360/99.06; 369/77.2
[58] Field of Search ................................. 360/92, 93, 94, 360/96.5, 99.02, 99.06; 369/75.1, 75.2, 77.1, 77.2

[56] References Cited

U.S. PATENT DOCUMENTS

| | | | |
|---|---|---|---|
| 4,012,790 | 3/1977 | Lemelson | 360/94 |
| 4,785,365 | 11/1988 | Ohkita | 360/96.5 |
| 4,803,575 | 2/1989 | Nishimura et al. | 360/94 |
| 5,220,552 | 6/1993 | Yokoi et al. | 360/99.06 |
| 5,383,072 | 1/1995 | Lee | 360/96.5 |
| 5,398,141 | 3/1995 | Tannert | 369/291 |
| 5,408,459 | 4/1995 | Kawaguchi et al. | 360/99.06 |
| 5,465,246 | 11/1995 | d'Alayer de Costemore D'Arc | 360/99.06 |
| 5,467,235 | 11/1995 | Watanabe | 360/99.06 |
| 5,468,060 | 11/1995 | Nagai | 369/77.2 |
| 5,648,882 | 7/1997 | Tangi et al. | 360/99.06 |
| 5,706,146 | 1/1998 | Ono et al. | 360/94 |

FOREIGN PATENT DOCUMENTS

| | | |
|---|---|---|
| 63-112890 | 5/1988 | Japan . |
| 63-181159 | 7/1988 | Japan . |
| 63-234486 | 8/1988 | Japan . |
| 1-320669 | 12/1989 | Japan . |
| 2-7261 | 1/1990 | Japan . |
| 2-252164 | 10/1990 | Japan . |
| 4-57241 | 2/1992 | Japan . |
| 6-52669 | 2/1994 | Japan . |
| 7-141852 | 6/1995 | Japan . |

*Primary Examiner*—David L. Ometz
*Attorney, Agent, or Firm*—Brinks Hofer Gilson & Lione

[57] ABSTRACT

A door opening-and-closing mechanism of a recording/reproducing apparatus including a door axially supported at the back side of a front face plate so as to be capable of opening and closing an opening, and a lock member for preventing free rotational movement of the door. The lock member includes a supporting shaft rotatably supported at the back side of the front face plate, lock portions which engage and disengage the door, and a portion to be pushed that projects into the opening, which are formed into an integral structure. The portion to be pushed is pushed by a disk cartridge being inserted in order to disengage the lock portions and the door from each other.

4 Claims, 5 Drawing Sheets

DOOR OPENING-AND-CLOSING MECHANISM OF RECORDING/ REPRODUCING APPARATUS

BACKGROUND OF THE INVENTION

1. Field of the Invention

The present invention relates to a recording/reproducing apparatus for performing recording/reproducing operations by inserting a cartridge containing a recording medium, such as a magnetic disk, into the apparatus, and, more particularly, to a door opening-and-closing mechanism for opening and closing an opening used for inserting a cartridge.

2. Description of the Related Art

A door opening-and-closing mechanism is widely used in, for example, a magnetic recording/reproducing apparatus for performing recording/reproducing operations of information on a magnetic disk contained in a disk cartridge. The door opening-and-closing mechanism prevents entry of foreign matter, such as dust, into the apparatus from an opening by a door provided at the opening for inserting a disk cartridge therein, when the disk cartridge is not loaded.

As disclosed, for example, in Japanese Unexamined Patent Publication No. 63-200386, in a conventionally known door opening-and-closing mechanism, a plate-shaped door is rotatably supported at the front face plate with an opening, and biased toward the closing direction of the opening by means of a torsion coil spring. In such a prior art door opening-and-closing mechanism, the opening is closed by the door, when the disk cartridge is not loaded. During insertion of the disk cartridge into the apparatus from the opening, the door is pushed by the disk cartridge and rotated, causing the disk cartridge to be loaded in position. Ejection of the disk cartridge out the apparatus causes rotation of the door in the opposite direction due to the biasing force of the torsion coil spring, whereby the door is re-closed.

The above-described conventional shutter opening-and-closing mechanism has the following problems. When the door is accidentally contacted by the operator with, for example, his finger or a writing material, the door is easily opened, allowing the entrance of foreign matter into the apparatus, since the door is biased in the closing direction of the opening merely by the torsion coil spring. In addition, in the game machine field or the like, disk cartridges of various sizes and shapes are sometimes used. In such a case, when the above-described conventional shutter opening-and-closing mechanism is used, the door is easily opened by disk cartridges which are not of the regular type, so that failure of the mechanism in the apparatus results due to accidental insertion of a disk cartridge which is not of the regular type.

SUMMARY OF THE INVENTION

Accordingly, an object of the present invention is to provide a locking means which prevents rotational movement of a door, when a cartridge is not loaded, and which is actuated by the cartridge, which is being inserted, to unlock the door. With such a locking means actuated by a cartridge, when an attempt is made to insert a regular type cartridge into the opening, the locking means is unlocked, which opens the door to allow insertion of the cartridge into the apparatus. On the other hand, when an attempt is made to insert a cartridge which is not of the regular type, the locking means remains locked to prevent rotational movement of the door, which reliably keeps out foreign matter from the opening.

To this end, according to the present invention, there is provided a door opening-and-closing mechanism of a recording/reproducing apparatus, which comprises a front face plate with an opening for inserting a cartridge, a door rotatably supported at the back side of the front face plate, an elastic member for biasing the door in the closing direction of the opening, and locking means for preventing rotational movement of the door. The locking means is provided with a lock portion engaging and disengaging the door, and a portion to be pushed extending into the opening. The cartridge, when being inserted, pushes the portion to be pushed to thereby disengage the lock portion and the door from each other.

Any locking means may be used as long as the locking means comprises the aforementioned lock portion and the aforementioned portion to be pushed. When the lock portion and the portion to be pushed are integrally formed with a supporting shaft, and the supporting shaft is rotatably supported at the back side of the front face plate, it is possible to simplify the task of assembling the locking means, in addition to simplifying the structure of the locking means.

In addition, when a cutout is formed in a portion of the peripheral face of the supporting shaft, and an anti-removal portion overlapping the peripheral face of the supporting shaft and a projection formed so as to be disposed within the cutout are formed at the back side of the front face plate, the supporting shaft can easily be incorporated into the anti-removal portion using the cutout. Thus, after assembly, the supporting shaft is reliably prevented from being removed from the back side of the front face plate by the anti-removal portion and the projection.

When a stopper is provided for preventing movement of a rotary shaft, rotatably supporting the door in the recording/reproducing apparatus, in the direction of insertion of the cartridge, it is possible to hold the door in the closing position by the locking means and the stopper to thereby reliably prevent breakage of the door, even in the case where the door is pushed by a cartridge which is not of the regular type.

When a projection projecting into the opening is provided at the front face plate, and a portion to be pushed of the locking means is disposed therearound, the aforementioned projection can prevent a cartridge which is not of the regular type from pushing the portion to be pushed, during an attempted insertion of the cartridge into the opening, so that insertion of a cartridge which is not of the regular type can be prevented.

When a taper which inclines in the direction of insertion is formed on the portion to be pushed, the portion to be pushed is pushed by the cartridge, while it is being inserted, at the taper, thus allowing smooth actuation of the locking means.

DESCRIPTION OF THE PREFERRED EMBODIMENT

A description will now be given of a preferred embodiment of the present invention, with reference to the drawings.

Figure 1:
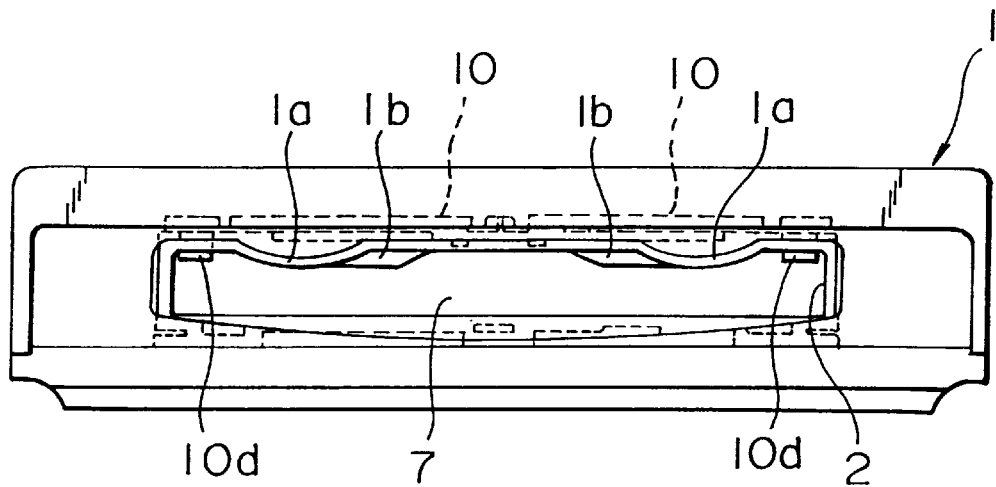
FIG. 1 is a front elevational view of a front face plate provided with a door opening-and-closing mechanism in an embodiment in accordance with the present invention.
Figure 2:
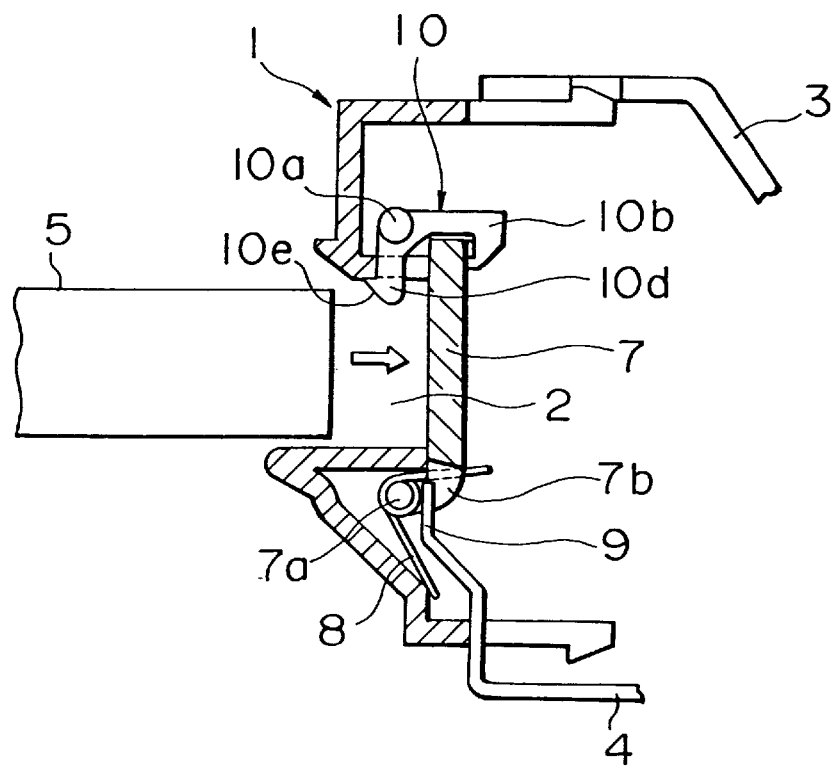
FIG. 2 is a sectional view of the door opening-and-closing mechanism in a closed state.

Referring to FIGS. 1 and 2, an opening 2 is formed in a front face plate 1 formed of synthetic resin. The front face plate 1 is snappingly secured to a holder 3 and a chassis 4 disposed in the magnetic recording/reproducing apparatus. The front face plate 1 has a pair of projections 1a that project downward from the upper boundary defining the opening 2. Second projections 1b are formed inwardly of the sides of the first projections 1a.

Figure 3:
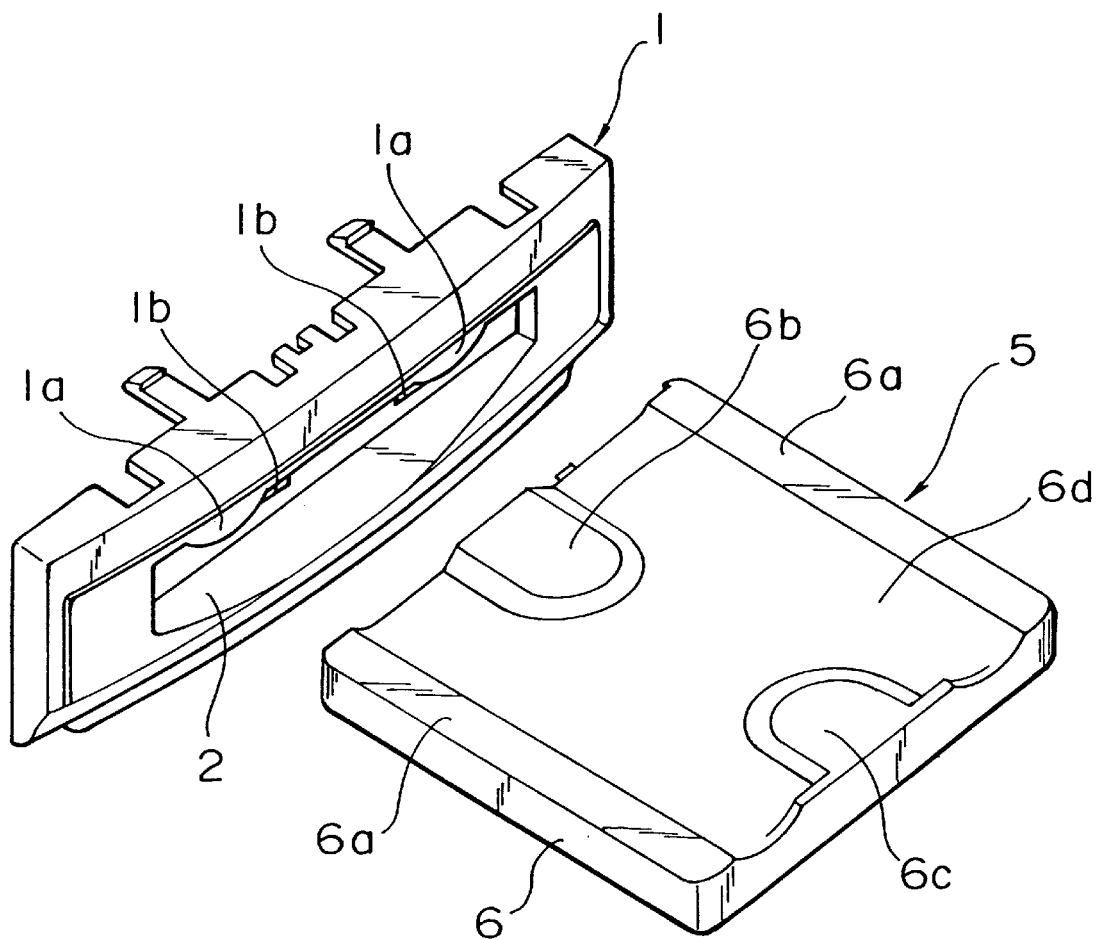
FIG. 3 is a perspective view showing the front face plate and the disk cartridge.
Figure 4:
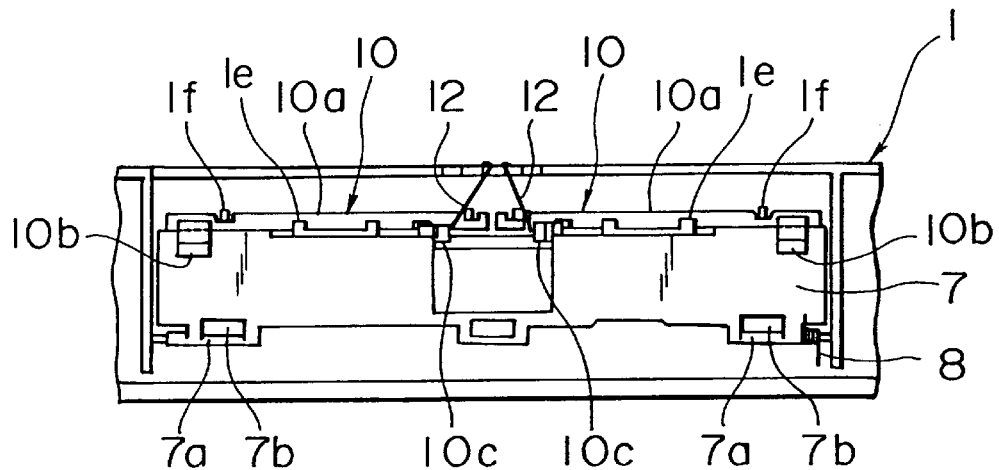
FIG. 4 is a rear elevational view of the front face plate of FIG. 1, as seen from the back side.

As shown in FIG. 3, the disk cartridge 5, used in the above-described magnetic recording/reproducing apparatus, has a cartridge case 6 formed of a hard synthetic resin, a magnetic disk (not shown) rotatably accommodated in the cartridge case 6, and a shutter (not shown) disposed so as to be capable of reciprocative movement along the lower surface of the cartridge case 6. Recesses and protrusions are formed at the upper surface of the cartridge case 6, with pushing protrusions 6a formed on both sides of the case 6. A pair of protuberances 6b, 6c are formed between both pushing protrusions 6a. Recessed portions 6d between the pushing protrusions 6a and the protuberance 6b are formed in correspondence with the first and second protrusions 1a and 1b at the front end face of the cartridge case 6, whereas the recessed portions between the pushing protrusions 6a and the protuberance 6c are formed only in correspondence with the first projections 1a. Therefore, when the disk cartridge 5 is properly inserted into the opening from the front end, the disk cartridge 5 is inserted in position, without contacting the first and second projections 1a and 1b. On the other hand, when an attempt is made to insert the disk cartridge 5 from its rear end, the second projections 1b come into contact with the protuberance 6c, which prevents insertion of the disk cartridge 5 into the opening 2.

A plate-shaped door 7 is disposed on the back side of the front face plate 1. Rotary shafts 7a are integrally formed with the door 7 at each of the lower ends thereof. Clearance holes 7b are formed in the door 7. The rotary shafts 7a are rotatably supported at the back side of the front face plate 1, one of which has a torsion coil spring 8 wound thereround. Both of the ends of the torsion coil spring 8 are retained by the door 7 and the back side of the front face plate 1, respectively. The door 7 is biased in the closing direction of the opening 2 due to the elasticity of the torsion coil spring 8. As shown in FIG. 2, a stopper portion 9 is provided behind each rotary shaft 7a. Although in the present embodiment, the stopper portions 9 are integrally formed with the chassis 4, they may be formed on a different component part in the magnetic recording/reproducing apparatus. The stoppers 9 function to prevent movement of the rotary shafts 7a in the direction of insertion of the cartridge (in the direction of the arrow in FIG. 2), but do not interfere with the rotational movement of the door 7 by moving into the clearance holes 7b.

Figure 5:
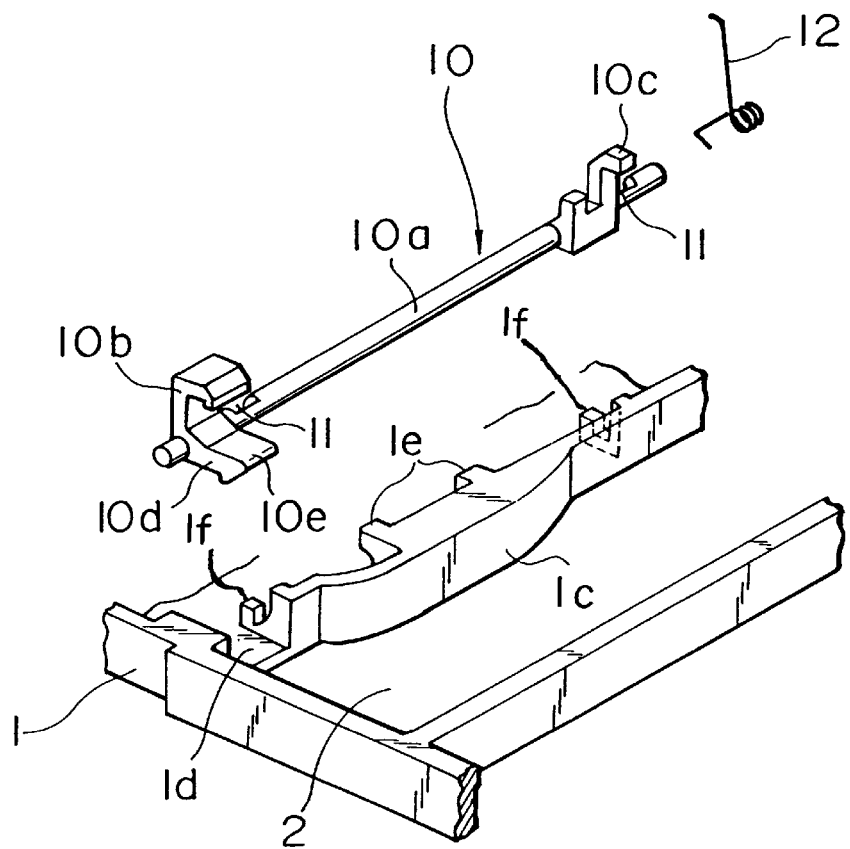
FIG. 5 is an exploded perspective view of the main portion of the door opening-and-closing mechanism.

A pair of lock members 10 are disposed at the back side of the front face plate 1 in order to prevent free rotational movement of the door 7. As shown in FIG. 5, each lock member 10 comprises a supporting shaft 10a with a pair of cutouts 11 formed in its outer peripheral surface, a pair of lock portions 10b and 10c integrally formed with both ends of the supporting shaft 10a, and a protrusion 10d to be pushed extending from and perpendicular to the lock portion 10b. The protrusion 10d has a chamfered taper 10e. A thick lateral projection 1c is formed at the back side of the front face plate 1, and extends along the peripheral edge of the opening 2 up to the boundary between it and the recesses 1d on both upper ends defining the opening 2. A pair of anti-removal portions 1e are formed at locations directly opposite to those portions of the lateral projection 1c at corresponding locations to the first and second protrusions 1a and 1b. Short protrusions 1f are formed on both sides of these anti-removal portions 1e. The insides of the anti-removal portions 1e are curved into recesses having substantially the same shape as the supporting shaft 10a. In the same way, the portion opposing each protrusion if is curved into a recess having substantially the same shape as the supporting shaft 10a.

Figure 6A:
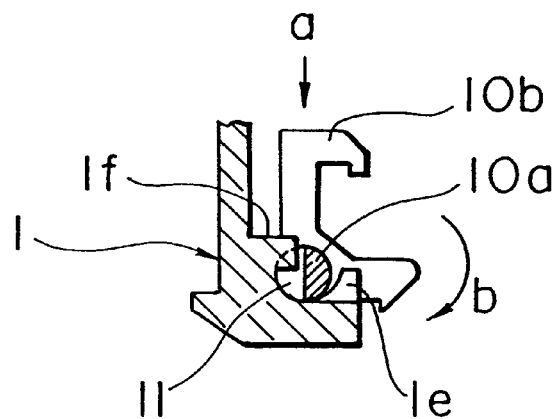
FIGS. 6A and 6B are views illustrating the procedure for incorporating the lock member.
Figure 6B:
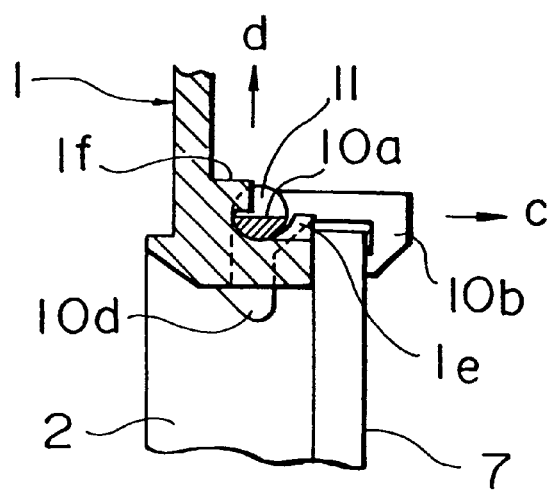

The lock members 10 are incorporated at the back side of the front face plate 1. When the ends of the torsion coil spring 12 wound around the supporting shaft 10a are retained near the lock portions 10c and the upper portion of the front face plate 1, the lock portions 10b and 10c are biased in the direction in which they are retained by the upper ends of the door 7 with respect to the supporting shaft 10a as a rotational supporting point. Such a lock member 10 is incorporated by the following procedure. As shown in FIG. 6A, the cutouts 11 of the lock member 10 are pushed in the direction of arrow a, while they are kept in opposing relationship to their corresponding protrusions if of the front face plate 1, followed by insertion of the supporting shaft 10a into the anti-removal portions 1e. Then, at the moment the supporting shaft 10a contacts the inner sides of each of the anti-removal portions 1e, the lock member 10 is rotated 90 degrees in the direction of arrow b, causing the protrusion 10d to be pushed to move into its associated recess 1d and project into the opening 2. As shown in FIG. 6B, the lock member 10 is rotatably incorporated at the back side of the front face plate 1. When the lock member 10 is set in a state shown in FIG. 6B, the anti-removal portions 1e prevent movement of the supporting shaft 10a in the direction of arrow c, while the protrusions if prevent movement of the supporting shaft 10a in the direction of arrow d, thus allowing the supporting shaft 10a to be rotatably supported so that it does not get removed from the front face plate 1.

When the disk cartridge 5 is not mounted to the magnetic recording/reproducing apparatus, the door opening-and-closing mechanism with the above-described construction is set such that the opening 2 is closed by the door 7, with the lock members 10 preventing free rotational movement of the door 7. Therefore, even when the door 7 is pushed with something other than the disk cartridge 5, such as when the operator accidentally pushes open the door 7 with his finger or a writing material, the lock members 10 prevent rotational movement of the door, thereby reliably preventing the entrance of foreign matter into the magnetic recording/reproducing apparatus from the opening 2. In addition, even when an attempt is made to insert a disk cartridge having a sectional shape which is different from the sectional shape of the cartridge 5 into the opening 2, the disk cartridge contacts the first protrusions 1a and the second protrusions 1b, which prevents the disk cartridge from pushing the protrusion 10d to be pushed. Therefore, the lock member 10 continues to prevent rotational movement of the door 7, thereby preventing accidental insertion of a disk cartridge which is not of the regular type. When the door 7 is pushed by a regular type disk cartridge 5, the pushing force is received by the upper and lower sides of the door 7 through the lock portions 10b and 10c of the lock member 10 and the stopper portion 9, resulting in less frequent breakage of the rotary shaft 7a of the door 7.

Figure 7:
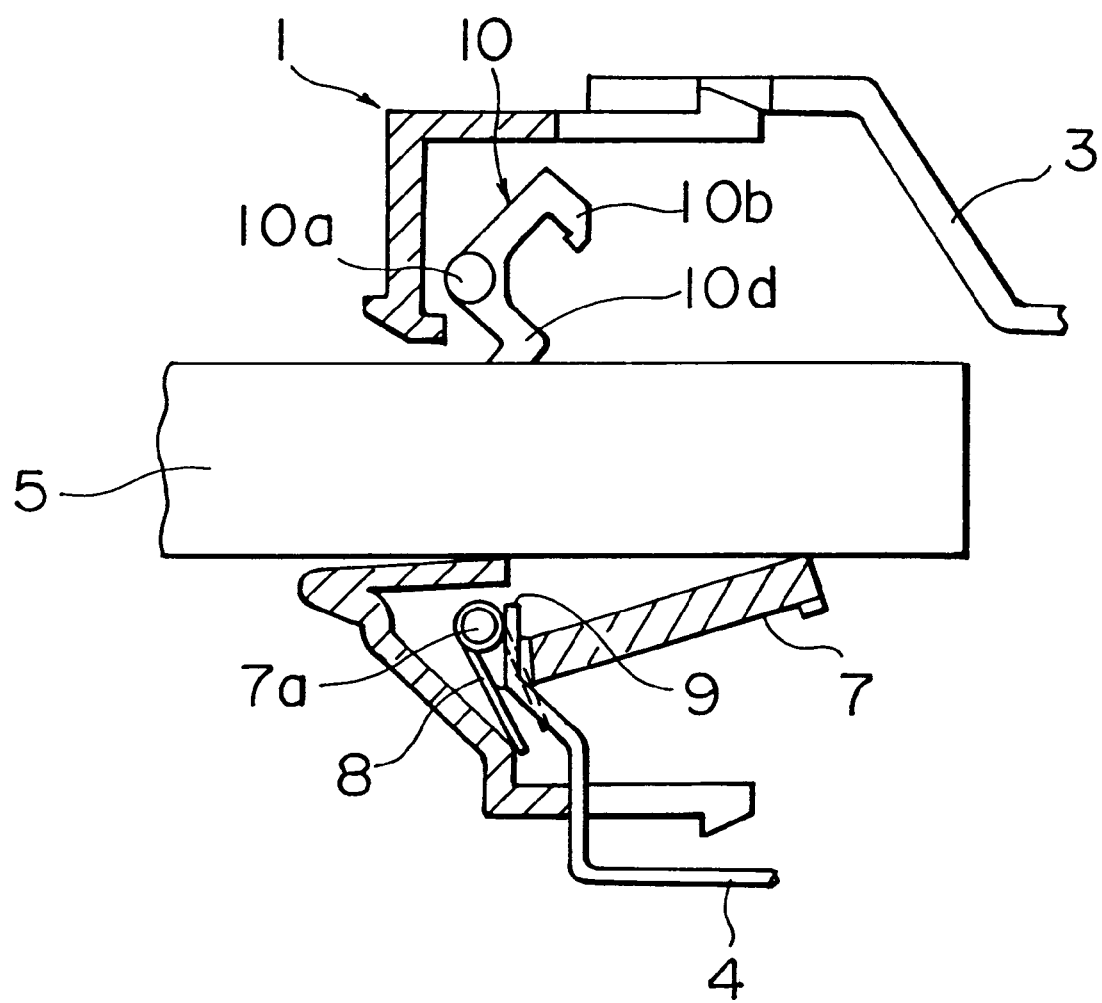
FIG. 7 is a sectional view of the door opening-and-closing mechanism in an opened state.

When the disk cartridge 5 is being pushed into the opening 2 in the direction of the arrow of FIG. 2, the protrusions 10d to be pushed projecting from both upper ends defining the opening 2 are pushed by their respective pushing protrusions 6a of the disk cartridge 5. Therefore, the lock member 10 rotates about the supporting shaft 10a as supporting point, which disengages the lock portions 10b and 10c and the door 7 from each other. Here, the protrusions 10d to be pushed and the pushing protrusions 6a contact each other at tapers 10e, respectively, so that the lock member 10 is reliably rotated, even when the disk cartridge 5 is slightly displaced in the opening 2. As shown in FIG. 7, when the disk cartridge 5 is further pushed into the opening and pushes the door 7, the door 7 rotates around the rotary shafts 7a as supporting points in order for the disk cartridge 5 to be held by the holder 3 in the magnetic recording/reproducing apparatus.

When an eject button (not shown) is operated to eject the disk cartridge 5 from the magnetic recording/reproducing apparatus to the opening 2, the door 7 rotates in the opposite direction due to the biasing force of the torsion coil spring 8, and the lock member 10 also rotates in the opposite direction due to the biasing force of the torsion coil spring 12. As a result, the opening 2 is re-closed by the door 7 which is prevented from freely rotating by the lock member 10.

What is claimed is:

1. A door opening-and-closing mechanism of a recording/reproducing apparatus for receiving a cartridge, said mechanism comprising:

a front face plate with an opening for inserting the cartridge, said opening having a substantially flat bottom surface opposite a top surface, and first and second opposed side surfaces;

a first pair of projections of said front face plate extending into said opening from said top surface;

a second pair of projections extending into said opening from said top surface;

a door rotatably supported at a back side of said front face plate;

an elastic member for biasing said door in the closing direction of said opening; and locking means for preventing rotational movement of said door, wherein said locking means comprises a lock portion which engages and disengages said door, and first and second portions to be pushed which protrude into said opening in proximity to said first and second opposed side surfaces, respectively, said first and second portions to be pushed being pushed by pushing protrusions on the top surface of the cartridge being inserted in order to disengage said lock portion and said door from each other, and such that said first pair of projections align with recessed regions on the top surface of the cartridge, and said second pair of projections prevent inverse insertion of the cartridge.

2. A door opening-and-closing mechanism of a recording/reproducing apparatus according to claim 1, wherein said door is rotatably supported by a rotary shaft having terminal ends and a central portion, and wherein said door opening-and-closing mechanism further comprises a stopper for preventing movement of said rotary shaft in the direction of insertion of the cartridge, said stopper positioned in proximity to said terminal ends and said central portion of said rotary shaft.

3. A door opening-and-closing mechanism of a recording/reproducing apparatus according to claim 1, wherein said locking means further comprises a supporting shaft rotatably supported at the back side of said front face plate, and a plurality of lock segments and wherein said supporting shaft, said lock portion, said plurality of lock segments, and said first and second portions to be pushed form an integral structure.

4. A door opening-and-closing mechanism of a recording/reproducing apparatus, said mechanism comprising:

a front face plate with an opening for inserting a cartridge;

a door rotatable supported at a back side of said front face plate;

an elastic member for biasing said door in the closing direction of said opening; and locking means for preventing rotational movement of said door, wherein said locking means comprises: a lock portion which engages and disengages said door; a portion to be pushed being pushed by the cartridge being inserted in order to disengage said lock portion and said door from each other; a supporting shaft rotatable supported at the back side of said front face plate, wherein said supporting shaft, said lock portion, and said portion to be pushed form an integral structure, and wherein said supporting shaft has a cutout formed in a portion of the peripheral face of said supporting shaft, and wherein said front face plate has at the back side thereof an anti-removal portion which overlaps the peripheral face of said supporting shaft, and said front face plate also has a projection formed so as to be disposed within said cutout.

* * * * *

UNITED STATES PATENT AND TRADEMARK OFFICE
CERTIFICATE OF CORRECTION

PATENT NO. : 5,940,245
DATED : August 17, 1999
INVENTOR(S) : Shinkichi Sasaki et al.

It is certified that error appears in the above-identified patent and that said Letters Patent is hereby corrected as shown below:

Claim 4, Col. 6, line 31, change "rotatable" to -- rotatably --.

Claim 4, Col. 6, line 42, change "rotatable" to -- rotatably --.

Signed and Sealed this

Sixth Day of June, 2000

Attest:

Q. TODD DICKINSON

*Attesting Officer*  *Director of Patents and Trademarks*